March 9, 1926.
R. BARRANTES ET AL
1,576,024
METHOD OF MANUFACTURING CELLULAR CUSHION TIRES
Filed June 11, 1925
2 Sheets-Sheet 1

INVENTORS
ROBERT BARRANTES,
ROBERT J. BONSTEIN,
& MARK A. REPLOGLE.
BY
ATTORNEY

March 9, 1926.  1,576,024
R. BARRANTES ET AL
METHOD OF MANUFACTURING CELLULAR CUSHION TIRES
Filed June 11, 1925  2 Sheets-Sheet 2
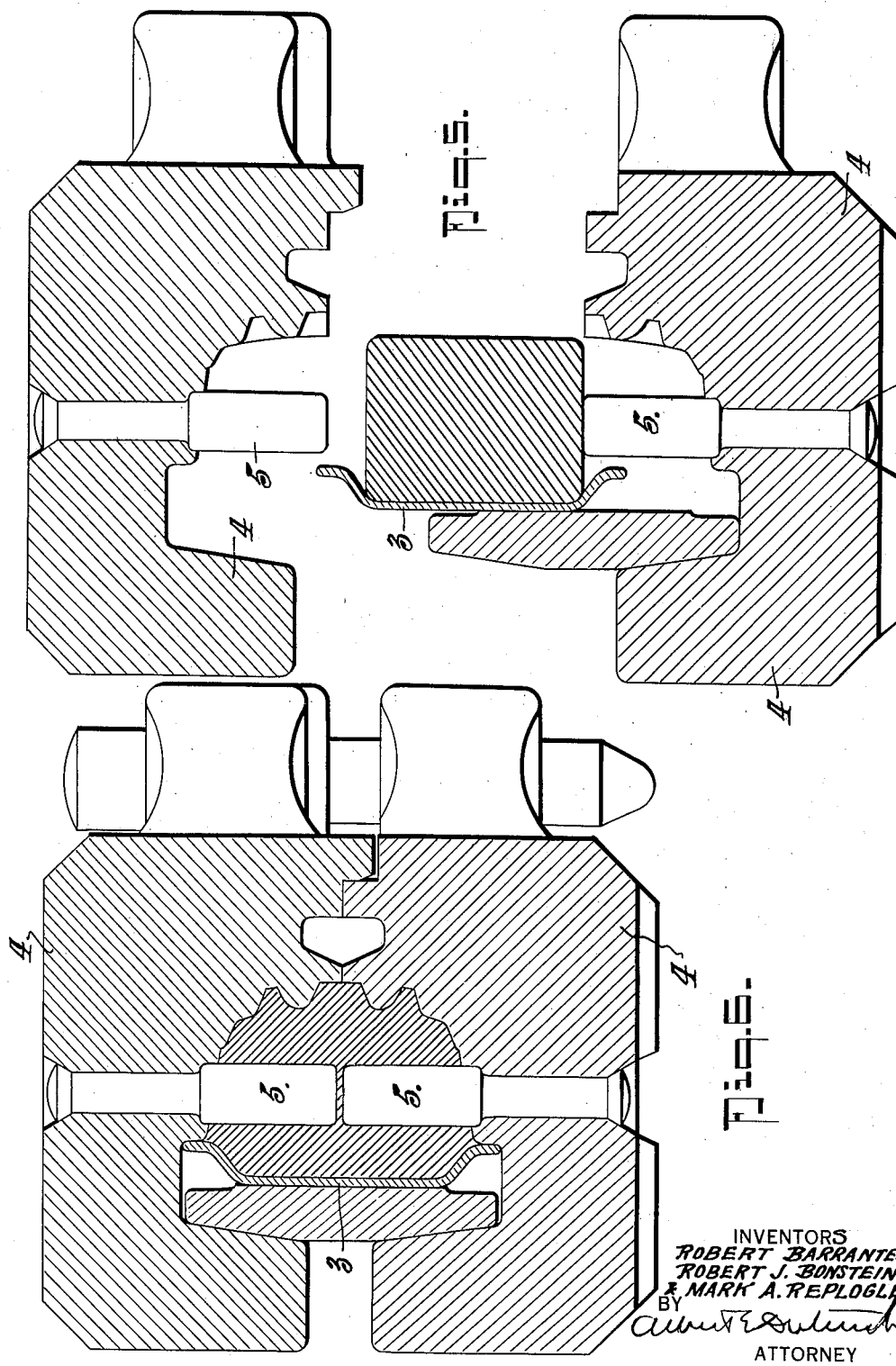
INVENTORS
ROBERT BARRANTES,
ROBERT J. BONSTEIN,
& MARK A. REPLOGLE.
BY
ATTORNEY Patented Mar. 9, 1926

1,576,024

UNITED STATES PATENT OFFICE.

ROBERT BARRANTES, OF KENMORE, AND ROBERT J. BONSTEIN AND MARK A. REPLOGLE, OF AKRON, OHIO, ASSIGNORS TO LAMBERT TIRE & RUBBER CO., OF BARBERTON, OHIO, A CORPORATION OF ARIZONA.

METHOD OF MANUFACTURING CELLULAR CUSHION TIRES.

Application filed June 11, 1925. Serial No. 36,519.

*To all whom it may concern:*

Be it known that we, ROBERT BARRANTES, ROBERT J. BONSTEIN, and MARK A. REPLOGLE, citizens of the United States, and residents of Kenmore, in the county of Summit and State of Ohio, Akron, in the county of Summit and State of Ohio, and Akron, in the county of Summit and State of Ohio, respectively, have invented certain new and useful Improvements in Methods of Manufacturing Cellular Cushion Tires, of which the following is a specification.

Our invention relates to the art of cushion tire manufacturing. Heretofore it has been the practice of tubing the stock for the tire in a continuous length, cutting the stock into lengths to make a tire of proper size, rolling the strip around the rim of the wheel, bringing the ends together to abut one another or by lap-joining the ends in such manner that the lap lies in a plane inclined to the tread face of the tire or approximately tangential to the rim.

This method has been found unsatisfactory for several reasons and our invention has for its object to provide a method in which the objectionable features of old methods are eliminated and better results are obtained and all danger of the finished tire breaking at the joint is eliminated.

In carrying out our invention we tube the stock as before and cut it into suitable lengths for the individual tire, bevel cutting their ends in such way that they may be lap-jointed together to produce a tire band or ring, the interior diameter of which is not greater than the diameter of the surface of the rim on which it is to be secured. The lap joint is made by bevel-cutting the stock in planes across the tread face of the tire, the planes, if extended, intersecting the axis of the tire, and securing the laps together without the necessity of using cement, by hammering to secure the primary adhesion and later by displacement of rubber from one lap into the other in the formation of the holes or cavities by the cold press process, i. e. by putting the rim and its band or rubber in a shaping mold to press the holes or recesses into the sides of the rubber and cause the stock to fill all the spaces of the mold cavities while the stock is cold; thereafter the mass is vulcanized in a vulcanizing mold while under pressure in the usual way.

By reference to the drawings:

Figure 1 indicates the strip of rubber as it comes from the tubing machine.

Figure 2 indicates one section cut from the strip of the length desired or required for the tire being made.

Figure 5 is a cross section showing the rim and the band in a tire mold before the mold is closed to squeeze the material.

Figure 6 is a view similar to Figure 5 showing the mold closed and the rubber displaced to fill the mold chamber.

Figure 1:
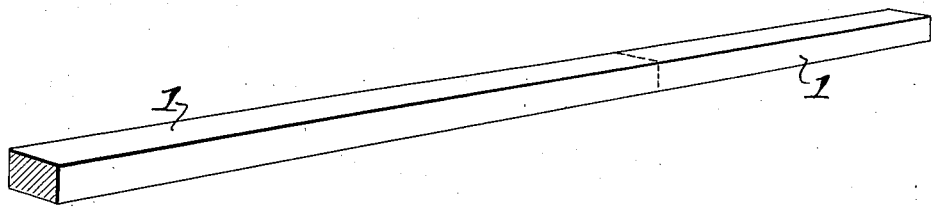
Figure 3:
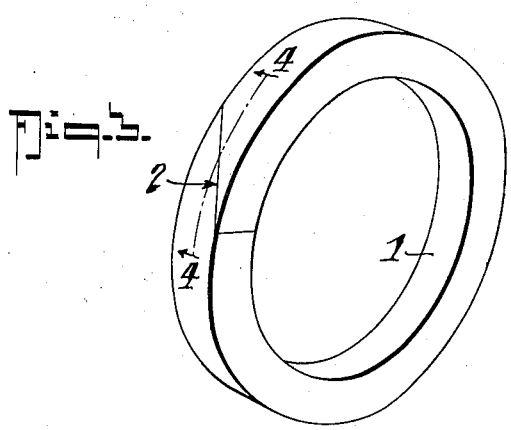
Figure 3 represents the rubber band or ring produced by bringing the bevel ends of the strip section together in a lap joint.

In the drawings, 1 represents the rubber strip as it comes from the tubing machine, 2—2 designates the bevel cut end surfaces, which are cut in planes across the tread so as to lie vertical as it were. 3 designates the rim, 4 the mold and 5 the mold pins which press the cavities into the tire stock and also serve to displace the material and squeeze it so as to fill the mold chambers and give to the carcass the required size and shape.

Figure 2:
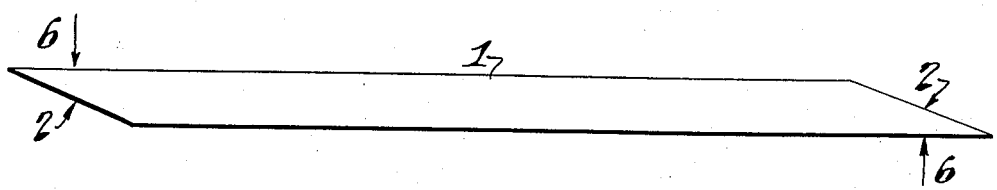
Figure 4:
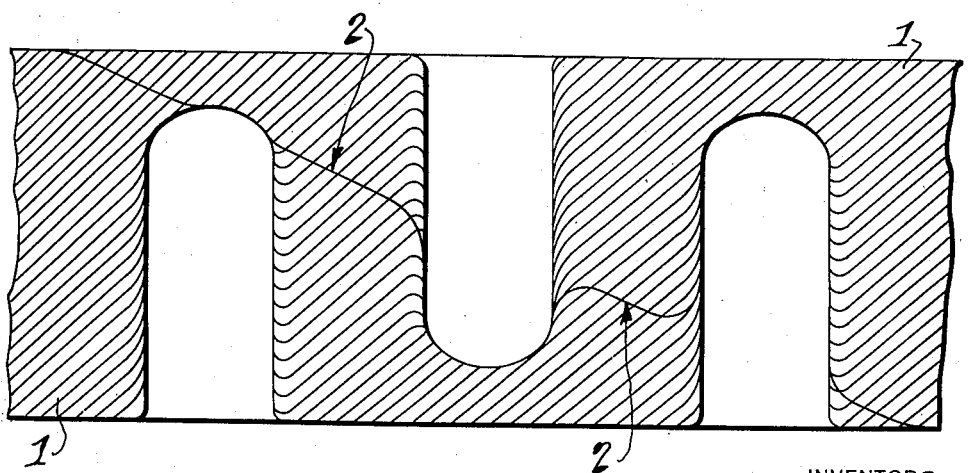
Figure 4 is a diagrammatic sectional view on the line 4—4 of Figure 3 illustrating what takes place when the mold pins are placed into the sides of the stock at the lap joint.

As before intimated, after the surfaces 2—2 are brought together they are hammered by the use of an ordinary hammer pounding on the sides of the stock in the direction of the arrows 6—6 in Figure 2. We find that by pounding the parts together in this way sufficient adhesion occurs between the surface of the vulcanized rubber to hold the strip in the form of a ring with sufficient tenacity so that the ring cannot separate while being stretched over the flange of the rim and allowed to contract in the groove thereof. After placing the ring or rubber on the rim the rim and rubber ring are placed as a unit in the forming and vulcanizing mold 4 and the latter is put into a hydraulic press and squeezed shut, thereby causing the pins 5 to penetrate the rubber carcass, forcing the rubber ahead of the pins and from one side of the tire carcass to the other. The pins are located sufficiently close together, or conversely, the length of the lap cut is sufficient to lap several pins, so that in passing the stock from one side toward the other, the stock from one lap will be displaced into the other lap and vice versa, thereby interlocking as it were the rubber at the lap, adding to the adhesive action.

After the rubber is placed in the mold and the mold forced shut, the mold with its contents are put into the vulcanizing kettle and the rubber vulcanized under pressure, thereby causing a complete unison of the rubber in the splice as well as giving the shape to the tire.

We find in practice that with this method of construction all danger of the tire separating at the splice has been practically eliminated.

From the foregoing description, taken in connection with the accompanying drawings, it is thought that the invention will be readily understood by those skilled in the art to which it relates.

What we claim is:

1. The method of manufacturing cushion tires which consists in tubing the stock, cutting it into strip lengths of the required size or cubical content, bevelling the ends and lapping them together to constitute an endless band, the splice or lap lying diagonally across the carcass in a plane passing through the axis of the tire, hammering the lapped ends together to cause a primary adhesion of the lapped surfaces, placing the band on a rim and vulcanizing the band thereon.

2. The method of manufacturing cushion tires which consists in tubing the stock, cutting it into strip lengths of the required size or cubical content, bevelling the ends and lapping them together to constitute an endless band, the splice or lap lying diagonally across the carcass in a plane passing through the axis of the tire, hammering the lapped ends together to cause a primary adhesion of the lapped surfaces, squeezing the carcass while confining it within predetermined limits to give it approximately the cross sectional shape and size desired before vulcanization and then vulcanizing the rubber while confined and under pressure.

3. The method of manufacturing cushion tires which consists in tubing the stock, cutting it into strip lengths of the required size or cubical content, bevelling the ends and lapping them together to constitute an endless band, the splice or lap lying diagonally across the carcass in a plane passing through the axis of the tire, hammering the lapped ends together to cause a primary adhesion of the lapped surfaces, squeezing the carcass while confining it within predetermined limits to give it approximately the cross sectional shape and size desired before vulcanization, pressing holes or recesses in the tire from the sides in directions across the splice whereby rubber is forced from one end splice over into the other and then vulcanizing the mass while under pressure.

4. The method of manufacturing cushion tires which consists in forming a strip of rubber of a length required to form the tire, bevel cutting the ends of the strip and lap jointing the same into a ring or band with the lapped surfaces lying on a bias when looking down on the tread of the tire, hammering the joint to cause primary adhesion, stretching the band over the rim, shaping the mass in a mold while cold, and vulcanizing the mass while under pressure.

5. The method of manufacturing cushion tires which consists in forming a strip of rubber of a length required to form the tire, bevel cutting the ends of the strip and lap jointing the same into a ring or band with the lapped surfaces lying on a bias when looking down on a tread of the tire, hammering the joint to cause primary adhesion, stretching the band over the rim, shaping the mass in a mold while cold to the desired cross section and simultaneously forcing rubber from one splice into the other splice in spots, and vulcanizing the mass while under pressure.

ROBERT BARRANTES.
ROBERT J. BONSTEIN.
MARK A. REPLOGLE.